(12) United States Patent
Tanaka et al.

(10) Patent No.: US 11,309,106 B2
(45) Date of Patent: Apr. 19, 2022

(54) DEVICE PROTECTED BY PTC ELEMENT

(71) Applicant: Littelfuse Japan G.K., Tokyo (JP)

(72) Inventors: Arata Tanaka, Ibaraki (JP); Keiichiro Nomura, Ibaraki (JP); Satoshi Sakamoto, Ibaraki (JP)

(73) Assignee: Liffelfuse Japan G. K., Tokyo (JP)

( * ) Notice: Subject to any disclaimer, the term of this patent is extended or adjusted under 35 U.S.C. 154(b) by 258 days.

(21) Appl. No.: 16/477,776

(22) PCT Filed: Jan. 10, 2018

(86) PCT No.: PCT/JP2018/000270
§ 371 (c)(1),
(2) Date: Aug. 11, 2019

(87) PCT Pub. No.: WO2018/131588
PCT Pub. Date: Jul. 19, 2018

(65) Prior Publication Data
US 2019/0371501 A1    Dec. 5, 2019

(30) Foreign Application Priority Data

Jan. 13, 2017 (JP) .............................. JP2017-003885

(51) Int. Cl.
*H01C 7/02* (2006.01)
*H01C 7/13* (2006.01)
*H02H 9/02* (2006.01)

(52) U.S. Cl.
CPC .............. *H01C 7/028* (2013.01); *H01C 7/13* (2013.01); *H02H 9/026* (2013.01)

(58) Field of Classification Search
CPC . H01C 7/028; H01C 7/13; H01C 7/02; H02H 9/026

USPC ........................................................ 361/93.7
See application file for complete search history.

(56) References Cited

U.S. PATENT DOCUMENTS

| 4,401,885 A | * | 8/1983 | Ishii ....................... | H05B 3/141 219/505 |
| 4,624,990 A | * | 11/1986 | Lunk ...................... | H01B 3/445 525/199 |

(Continued)

FOREIGN PATENT DOCUMENTS

| CN | 1264489 A | 8/2000 |
| JP | 2003-297604 A | 10/2003 |

(Continued)

OTHER PUBLICATIONS

C.A. Mahieux, D. Lehmann, A. desLigneris, Experimental determination of the effects of industrial oil immersion on polymer-based composites, Polymer Testing, vol. 21, Issue 7, 2002, pp. 751-756, ISSN 0142-9418 (Year: 2002).*

(Continued)

*Primary Examiner* — Scott Bauer
*Assistant Examiner* — Sreeya Sreevatsa
(74) *Attorney, Agent, or Firm* — Kacvinsky Daisak Bluni PLLC

(57) ABSTRACT

The present invention provides an apparatus having a protecting element for protecting the apparatus in an emergency, wherein the protecting element is a polymer PTC element, the polymer PTC element has a polymer PTC member, and the polymer PTC member is formed from a polymer composition containing a polyvinylidene fluoride as a main component.

19 Claims, 3 Drawing Sheets

(56) References Cited

U.S. PATENT DOCUMENTS

| | | | |
|---|---|---|---|
| 5,093,898 A | | 3/1992 | van Konynenburg et al. |
| 5,166,658 A | * | 11/1992 | Fang ................ H01C 7/021 |
| | | | 338/22 R |
| 5,174,924 A | * | 12/1992 | Yamada ............... C08K 3/04 |
| | | | 252/502 |
| 5,645,746 A | * | 7/1997 | Walsh .............. B60R 16/0207 |
| | | | 219/203 |
| 5,802,709 A | | 9/1998 | Hogge et al. |
| 6,143,206 A | * | 11/2000 | Handa ................ H01C 7/027 |
| | | | 219/541 |
| 2002/0162214 A1 | * | 11/2002 | Hetherton ............ H01C 7/18 |
| | | | 29/623 |
| 2003/0132025 A1 | * | 7/2003 | Wakihara ............ H05K 3/384 |
| | | | 174/256 |
| 2004/0231141 A1 | * | 11/2004 | Nishinaka ............ H05K 3/108 |
| | | | 29/609 |
| 2008/0074232 A1 | * | 3/2008 | Chen ............. H01C 17/06586 |
| | | | 338/22 R |
| 2009/0224703 A1 | * | 9/2009 | Woods ............... H02H 7/08 |
| | | | 318/17 |
| 2016/0099483 A1 | * | 4/2016 | Lee .................. H01M 4/139 |
| | | | 429/217 |

FOREIGN PATENT DOCUMENTS

| | | |
|---|---|---|
| JP | 2012045631 A | 3/2012 |
| JP | 2014-183222 A | 9/2014 |

OTHER PUBLICATIONS

A. Haas and J. Kindersberger, "Evaluation of influence of mineral oil immersion on dielectrical properties of silicone polymers by Thermal Analysis," 2009 IEEE Conference on Electrical Insulation and Dielectric Phenomena, 2009, pp. 327-330, doi: 10.1109/CEIDP.2009.5377900 (Year: 2009).*

Supplementary European Search Report dated Sep. 16, 2020 for European Patent Application No. 18739121.4.

International Preliminary Report on Patentability for the International Patent Application No. PCT/JP2018/000270, dated Jul. 25, 2019, 7 pages.

International Search Report from PCT/JP2018/000270 dated Jul. 19, 2018, with translation 3 pages.

Written Opinion from PCT/JP2018/000270 dated Jul. 19, 2018, in Japanese, 3 pages.

* cited by examiner

DEVICE PROTECTED BY PTC ELEMENT

TECHNICAL FIELD

The present invention relates to an apparatus having a protection circuit including a polymer PTC (Positive Temperature Coefficient) element.

BACKGROUND ART

In the event that abnormalities occur in a variety of apparatuses, such as electronic or electrical apparatuses, for example, if an excessive current flows through such an apparatus or the temperature of such an apparatus becomes abnormally high, various protecting elements such as fuse elements and PTC (positive temperature coefficient) elements (Patent Document 1) are used as a protecting element that blocks current flowing in the circuit of the apparatus. It is with respect to these and other considerations that the present improvements may be useful.

When a fuse element is used as the protecting element, once the fuse element operates and is melted down, it is necessary to replace the fuse element with a new one. Thus, when the fuse element operates, the cost and time for part replacement are required. Therefore, a PTC element, which is a resettable element that can return to a pre-operation state thereof when the abnormality is removed after the operation, is preferably used.

Examples of the PTC element described above include a polymer PTC element and a ceramic PTC element, and the polymer PTC element is preferably used because it is easily manufactured, the resistance value of the element itself is low, and self-destruction is unlikely to occur even if the temperature reaches a certain or higher temperature. Among them, a polymer PTC element using polyethylene having a high crystallinity and a large resistance change during tripping is preferably used.

PRIOR ART DOCUMENTS

Patent Document 1: JP 2003-77705 A

SUMMARY OF THE INVENTION

As described above, in the various apparatuses, the polyethylene polymer PTC element is used. However, the present inventors have realized that in long-term use of the apparatus, a resistance value of the polymer PTC element during a normal time may increase and cause failures in the operation of the apparatus. As a result of investigating this cause, it has been realized that oils and fats penetrate into a polymer PTC composition of the polymer PTC element from the exposed portion, which causes the swelling of the polymer PTC composition, resulting in rise of the resistance value of the polymer PTC element, which causes the failure.

An object of the present invention is, accordingly, to provide an apparatus in which it is difficult to cause abnormal incidents due to an increase in a resistance value of a polymer PTC element even if used in an environment where oils and fats may be present in the surroundings.

Means for Solving the Problem

As a result of diligent research on the problems described above, the present inventors have found that when a polymer composition containing a polyvinylidene fluoride (PVDF), instead of polyethylene, as a main component is used as the polymer composition, in a polymer PTC member of the polymer PTC element, the penetration of oils and fats can be prevented and the increase in the resistance value can be suppressed; and thus have completed the present invention.

A first gist of the present invention provides an apparatus having a protecting element for protecting the apparatus in an emergency, in which the protecting element is a polymer PTC element, the polymer PTC element has a polymer PTC member, and the polymer PTC member is formed from a polymer composition containing a polyvinylidene fluoride as a main component.

A second gist of the present invention provides a method for preventing malfunction in an apparatus caused by overcurrent or abnormal heat generation, the method including incorporating, into the apparatus, a polymer PTC element having a polymer PTC member formed from a polymer composition containing a polyvinylidene fluoride as a main component, as a protecting element.

Effects of the Invention

According to the present invention, it is possible to provide an apparatus that can continue to be operated normally even in a long term use, by using the polymer PTC element using the polymer composition containing polyvinylidene fluoride as a main component, as the element for protecting the apparatus.

MODE FOR CARRYING OUT THE INVENTION

Figure 1:
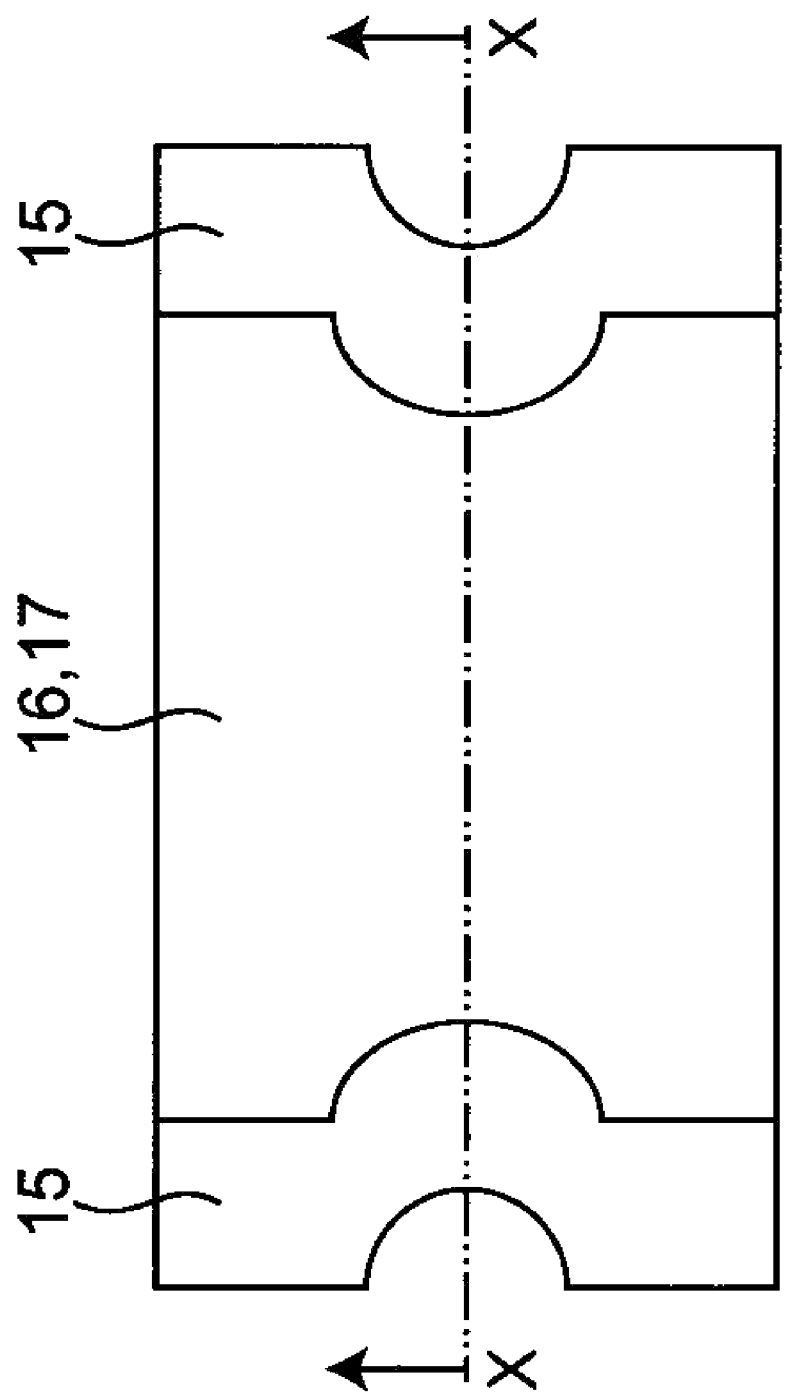
FIG. 1 is a plan view of PTC elements A1, A2, and B used in Examples.

The present invention will be described in detail below.

An apparatus of the present invention has a protecting element for protecting the apparatus in an emergency, particularly when overcurrent flows or an abnormal high temperature occurs. Typically, the protecting element is installed in a circuit of a controller, a driver, and the like of industrial equipment described below, for example, a controller, a motor driver, and the like of an industrial robot.

The apparatus is not particularly limited, and preferably may be an apparatus as is used in environments where oils and fats or solvents are present, particularly in environments where oils and fats or solvents are present in the form of a steam (i.e., gas), or a fine particle scattering.

Examples of the apparatus include industrial equipment, for example, machining equipment including cutting apparatuses such as a lathe, a milling machine, a grinder, a drilling machine, a gear cutting machine, and a cutting machine, industrial robots for machining, assembly, painting, or transportation, and the like.

In a preferred aspect, the apparatus may be an apparatus including the cutting apparatus such as a lathe, a milling machine, a grinder, a drilling machine, a gear cutting machine, or a cutting machine.

The oils and fats may be oils and fats commonly used in various apparatuses, and examples thereof include mechanical oils, grease, cutting oils, and the like.

The cutting oil is not particularly limited, and examples thereof include oils having high permeability to polymers.

Furthermore, the cutting oil is preferably a cutting oil containing mineral oil corresponding to kerosene, light oil, or B heavy oil, which contains a linear or branched hydrocarbon having 10 to 23 carbon atoms as a main component.

Examples of the cutting oil include EC50, Synthetic #880, FGE355, and Yushiroken FGE350 manufactured by Yushiro Chemical Industry Co., Ltd.; Alusol EM-B manufactured by BP Japan Co., Ltd.; UNISOLUBLE EM-B, UNISOLUBLE EM-B manufactured by JX Nippon Oil & Energy Corporation, Ltd., and the like. In particular, as the cutting oil, EC50, FGE355, Yushiroken FGE350, Alusol B, UNISOLUBLE EM-B, and UNISOLUBLE EM-B are preferable; FGE 355, Yushiroken FGE350, Alusol B, UNISOLUBLE EM-B, and UNISOLUBLE EM-B are more preferable; and FGE355, Yushiroken FGE350, and Alusol B are particularly preferable. In the apparatus of the present invention, it is difficult to cause malfunction when using the cutting oil described above. The apparatus of the present invention maybe a cutting machine using the cutting oil described above.

The solvent can be solvents commonly used in various apparatuses, and examples thereof include solvents for cleaning, for example, hydrocarbons, organic acids, alcohols, chlorine-containing hydrocarbons, and the like. The solvent may also be a solvent included in a subject to be treated by the apparatus.

The protecting element is the polymer PTC element. The polymer PTC element used in the present invention has the polymer PTC member. The polymer PTC element may have an electrode on at least one major surface of the polymer PTC member.

The polymer PTC member described above is formed from the polymer PTC composition in which an electrically conductive filler is dispersed in a polymer composition.

The polymer composition described above is a polymer composition containing a polyvinylidene fluoride as a main component. The main component refers to a component which is most contained in a polymer composition. The amount of the polyvinylidene fluoride in the polymer composition is not particularly limited, and is contained, for example, in an amount of 55 mass % or more, preferably 60 mass % or more, more preferably 70 mass % or more, still more preferably in 75 mass % or more.

The weight average molecular weight of the polyvinylidene fluoride is not particularly limited, and is, for example, preferably $5\times10^3$ to $1\times10^6$, more preferably $1\times10^4$ to $2\times10^5$. The crystallinity of the polyvinylidene fluoride is, for example, preferably 30 to 60%, more preferably 50 to 60%.

Other polymer components included in the polymer composition are not particularly limited, and may be polyethylene, acrylic polymers, methacrylic polymers, fluoropolymers, and the like. A preferable polymer may be polymers having a resistance to oils and fats, and solvents, for example, fluorine-containing polymers. In this case, the content of the fluorine-containing polymer other than the polyvinylidene fluoride in the composition is less than 45%, preferably 5 to 30 mass %, more preferably 10 to 20 mass %. The polymer composition may also contain various additives such as salts, crosslinking aids, and the like.

Examples of the electrically conductive filler include carbon black, graphite (or black lead), other carbonaceous materials, metals, conductive metal oxides, conductive ceramics, conductive polymers, and combinations thereof. The electrically conductive filler is typically in a powder state.

Examples of the carbonaceous material include carbon fibers, carbon nanotubes, glassy carbon, and carbon beads, in addition to carbon black and graphite. Examples of the metal include gold, silver, copper, nickel, aluminum, tungsten, and alloys thereof. Examples of the metal oxide include ITO (indium-tin oxide), lithium-manganese complex oxide, vanadium pentoxide, tin oxide, zinc oxide, and potassium titanate. Examples of the electrically conductive ceramic may include carbide (for example, tungsten carbide, titanium carbide, tantalum carbide, and composite (or complex compound) thereof), titanium borate, titanium nitride, titanium silicide, zirconium silicide, niobium silicide, molybdenum silicide, tantalum silicide, and tungsten silicide. Examples of the electrically conductive polymer include polyacetylene, polypyrene, polyaniline, polyphenylene, and polyacene.

The electrically conductive filler is preferably carbon black, carbon nanotube, titanium carbide, tungsten carbide, or nickel powder, more preferably carbon black, tungsten carbide, or nickel powder.

The proportion of the electrically conductive filler in the polymer PTC composition is not particularly limited as long as the functionality as a PTC composition can be ensured, and may be 20 vol % or more, for example, 30 to 60 vol %, preferably 30 to 50 vol %, for example 35 to 45 vol %, relative to the whole polymer PTC composition. The volume % (vol %) of the electrically conductive filler can be obtained by calculating volumes of the polymer and the electrically conductive filler from the weight and the density of the polymer and the electrically conductive filler used. When the proportion is set within the value described above, PTC properties such as resistivity at room temperature and resistance change rate can be improved.

The polymer PTC member is obtained by molding the polymer PTC composition into a layered form, for example by extrusion molding, injection molding, or hot pressing.

The thickness of the polymer PTC member is not particularly limited, and may be, for example, 0.01 mm to 5 mm, preferably 0.05 mm to 3 mm, more preferably 0.1 mm to 1 mm.

The polymer PTC element may have an electrode on at least one major surface of the polymer PTC member. In one aspect, the electrode is present only on one major surface. In another aspect, the electrode may be present on each of both major surfaces. In a preferred aspect, the electrode may be present on each of both major surfaces.

The electrode is typically formed of a thin layer of conductive metal (e.g., the thickness is about 0.1 µm to 100 µm). One or a plurality of thin metal layers may be present. Examples of the metal material that forms the electrode include metals such as copper, nickel, aluminum, and gold.

The polymer PTC element can be manufactured by simultaneously extruding the polymer PTC composition forming the polymer PTC member together with metal sheets (or metal foils) forming the electrode, thereby obtaining an extrudate in which the polymer PTC composition is put between the metal sheets (or metal foils). In another aspect, the element can also be manufactured in a manner in which a layered product of the polymer PTC composition is obtained, for example, by extrusion, the layered product is put between metal sheets (or metal foils), and the resulting product is integrally thermocompressed into a crimped body. Such an extrudate (or crimped body) is in a state in which a large number of the polymer PTC members having electrodes on the both main surfaces are gathered adjacently to each other, and the extrudate (or crimped body) is cut into pieces having predetermined shape and size, whereby an individual polymer PTC element can be obtained.

In another aspect, the polymer PTC member may be plated with a conductive metal to form an electrode on each of both major surfaces. Also in this case, preferably, the members are obtained in a gathered state, as described above, and then the obtained product is divided into individual polymer PTC elements.

In one aspect, the polymer PTC element may be protected by a film, or the like. When a protective member such as a film is provided to the polymer PTC element, it is possible to further improve environmental resistance.

In another aspect, the polymer PTC element does not have a protective member such as a film. The polymer PTC element, accordingly, is exposed. Since the polymer PTC element has sufficient environmental resistance, the polymer has excellent durability even if there is no protective member as described above.

In the polymer PTC element as described above, it is difficult to cause degradation, for example, swelling, of the polymer PTC member due to oils and fats, or a solvent, even in an environment where the oils and fats, or solvent may be present. It is thereby difficult to increase the resistance value during a normal period. The polymer PTC element, accordingly, can be suitably used in apparatuses used in an environment where oils and fats or solvents may be present, and particularly the polymers easily become steam or easily scatter. Since the polymer PTC element has the high resistance to the oils and fats, and the solvent as described above, i.e., has the high environmental resistance, advantageously, the degree of freedom of the installation location of the polymer PTC element in the apparatus of the present invention is high, and the degree of freedom of the installation location of the apparatus itself of the present invention is high. For example, the protecting element may be provided on an exposed portion of the apparatus (i.e., a place which is exposed to the oils and fats, solvents, etc.). In addition, it is also advantageous that no measure be needed to protect the polymer PTC element from the oils and fats, and solvents.

As described above, the polymer PTC element used in the apparatus of the present invention has a high environmental resistance, and does not cause malfunction (failure) even if used for a long period of time. The present invention, accordingly, also provides a method for preventing abnormality, particularly malfunction in an apparatus caused by overcurrent or abnormal heat generation, the method including incorporating, into the apparatus, the polymer PTC element having the polymer PTC member formed from the polymer composition containing the polyvinylidene fluoride as a main component, as a protecting element.

The method of the present invention described above can be suitably used in an environment where oils and fats, or a solvent may be present, especially where they easily become steam or easily scatter.

The present invention will be further described through the following Examples, but the present invention is not limited to Examples described below.

EXAMPLES

Oil Durability Test Example 1 Polymer PTC elements A1 and A2, containing polyvinylidene fluoride (PVDF) and an ethylene-tetrafluoroethylene copolymer (ETFE) as base materials, and a polymer PTC element B containing a high density polyethylene (HDPE) as a base material, were reflowed onto a substrate and subjected to oil durability tests. The oil durability test was performed by immersing the PTC element reflowed in a container containing oil (EC50), and holding the element in a constant-temperature bath (temperature: 85° C.). After a predetermined period of time, it was allowed to stand at room temperature (25° C.) for 1 hour and then a resistance value was measured at 25° C. The ratio of the resistance value after the test was calculated, assuming the resistance value after the reflow being as 1.00. The results are shown in Table 1.

Figure 2:
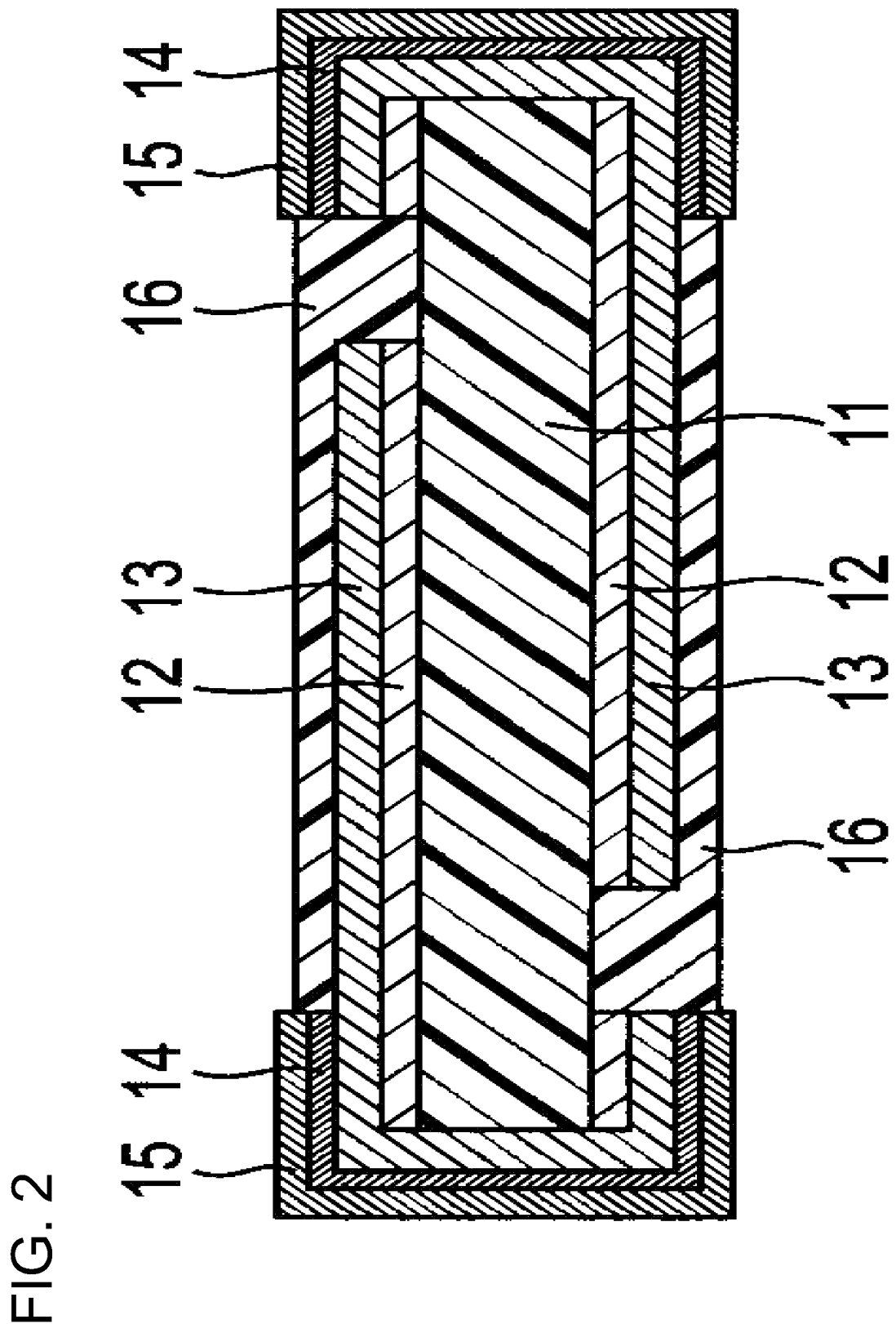
FIG. 2 is an X-X cross-sectional view of PTC elements A1 and B used in Examples
Figure 3:
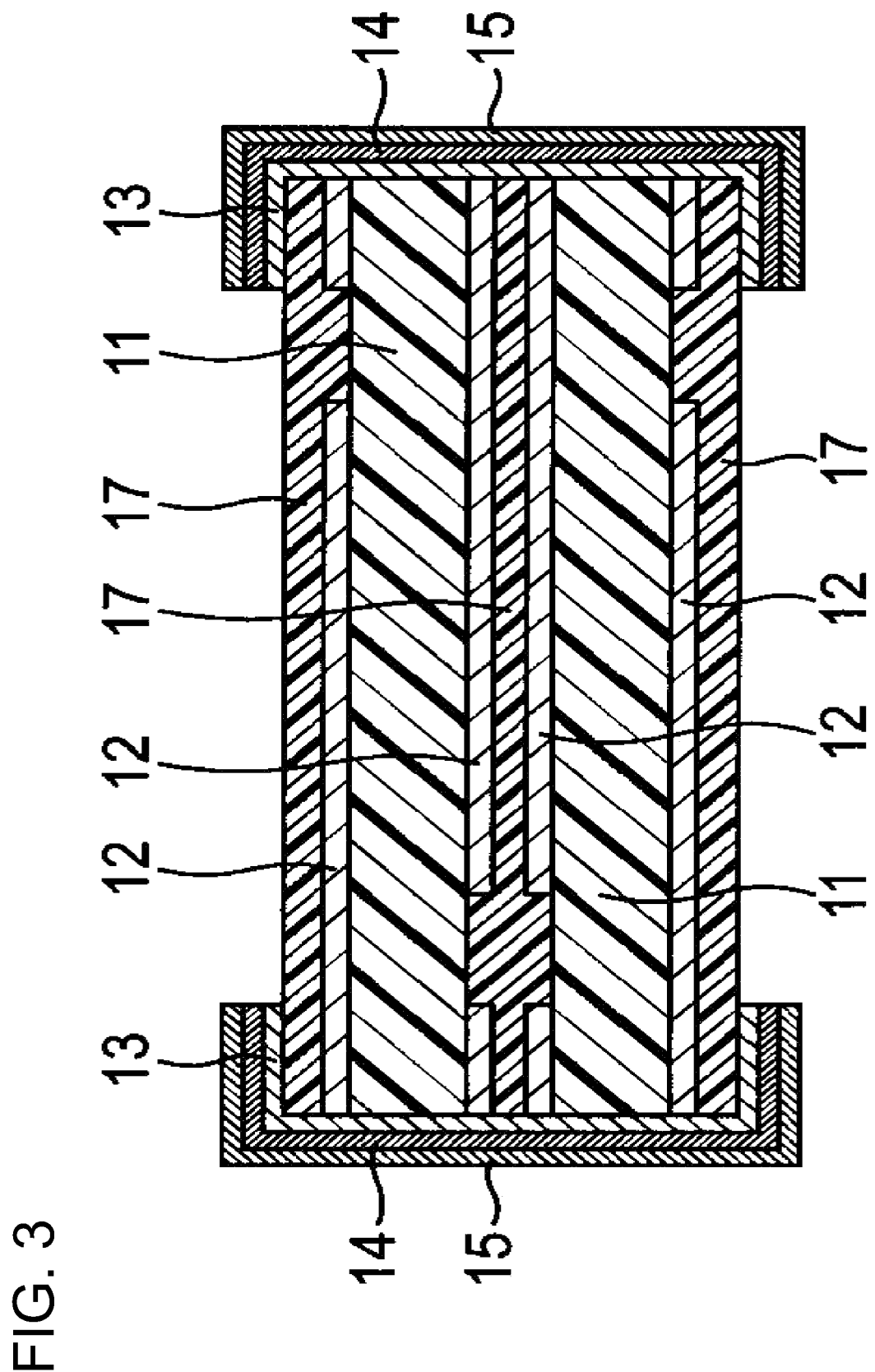
FIG. 3 is an X-X cross-sectional view of PTC element A2 used in Example.

Polymer PTC Element A1 (FIGS. 1 and 2):
Size: 7.5×5.5 mm
Initial Resistance: 185 mΩ
Polymer PTC Part (PTC composition 11+copper foil 12)
  PTC Polymer: PVDF (58 mass %), ETFE (10 mass %)
  Electrically Conductive Filler: Carbon Black (32 mass %) Thickness: 0.34 mm
Copper Plating 13
Thickness: 0.025 mm
Nickel Plating 14
Thickness: 0.005 mm
Tin Plating 15
Thickness: 0.045 mm
Solder Resist 16
Thickness: 0.02 mm
Polymer PTC Element A2 (FIGS. 1 and 3):
Size: 7.5×5.5 mm
Initial Resistance: 180 mΩ
2 Polymer PTC Parts (PTC composition 11+copper foil 12)
PTC Polymer: PVDF (56 mass %), ETFE (10 mass %)
Electrically Conductive Filler: Carbon Black (34 mass %)
Thickness: 0.34 mm each
Copper Plating 13
Thickness: 0.03 mm
Nickel Plating 14
Thickness: 0.005 mm
Tin Plating 15
Thickness: 0.05 mm
Prepreg 17
Thickness: 0.06 mm
Polymer PTC Element B (FIGS. 1 and 2):
Size: 4.5×3.2 mm
Initial Resistance: 115 mΩ
Polymer PTC Parts (PTC composition 11+copper foil 12)
PTC Polymer: HDPE (43 mass %)
Electrically Conductive Filler: Carbon Black (57 mass %)
Thickness: 0.26 mm
Copper Plating 13
Thickness: 0.025 mm
Nickel Plating 14
Thickness: 0.005 mm
Tin Plating 15
Thickness: 0.045 mm
Solder Resist 16
Thickness: 0.02 mm

TABLE 1

|  | Resistance Change Rate after Test Immersion Time (hours) | | |
| --- | --- | --- | --- |
|  | 0 | 100 | 200 |
| PTC Element A1 | 1.00 | 0.80 | 0.74 |
| PTC Element A2 | 1.00 | 0.81 | 0.77 |
| PTC Element B | 1.00 | — | 1.98 |

As shown in Table 1, in the polymer PTC elements A1 and A2 containing PVDF as the base material, an increase of the resistance value was not observed even after they were immersed in the oil for 200 hours. On the other hand, in the polymer PTC element B containing HDPE as the base material, the resistance value increased by approximately twice after it was immersed in the oil for 200 hours. From the above results, it was confirmed that the PTC elements A1 and A2 of the present invention had the environmental resistance higher than that of the known PTC elements B.

Example 2

An oil durability test was performed in the same manner as in Example 1 with the exception that the oil used was changed from EC50 (oil 1) to the oils 2-9 shown in Table below.

Properties of each oil obtained by a gas chromatography mass spectrometry are shown in Tables 2 and 3, and the results obtained in the oil durability test after immersion for 200 hours are shown in Table 4.

TABLE 2

| | Oil Name | Manufacturer | Properties |
|---|---|---|---|
| 1 | EC50 | Yushiro Chemical Industry Co., Ltd. | Soluble in water, insoluble in hexane, and clouded in acetone. Contains bis(2-methoxyethyl)propyl amine, cyclohexyl amine, and oleic acid as main components. |
| 2 | No, 4 oil | Yushiro Chemical Industry Co., Ltd. | Insoluble in water, and soluble in hexane and acetone. Mineral oil similar to kerosene. A peak of hydrocarbon having approximately 10 to 15 carbon atoms. Formed from a linear hydrocarbon and a branched hydrocarbon. The number of the branched hydrocarbons is larger than that of the kerosene. |
| 3 | No, 5 oil | Yushiro Chemical Industry Co., Ltd. | Insoluble in water, and soluble in hexane and acetone. A peak of a hydrocarbon corresponding to a kerosene fraction having approximately 10 to 15 carbon atoms, and a peak of a hydrocarbon corresponding to a light oil fraction having approximately 16 to 23 carbon atoms. Contains chlorine (20%) and sulfur (0.4%). Contains hydrocarbons corresponding to kerosene and light oil, and oil corresponding to mechanical oil having many branched structures as main components. |
| 4 | Synthetic # 880 | Yushiro Chemical Industry Co., Ltd. | Soluble in water and hexane, and clouded in acetone. Contains 2-methoxyethylpropyl amine, 2,2-dimethyl octanoic acid, triethanol amine, and 3-tert-butyl benzoic acid as main components. |
| 5 | FGE355 | Yushiro Chemical Industry Co., Ltd. | Soluble in water and acetone, and clouded in hexane. A mechanical oil-like mineral oil formed of branched hydrocarbons having approximately 13 to 23 carbon atoms, and linear hydrocarbon dodecane and tridecane in slight amounts. Also contains sulfur, cyclohexane amine, and oleic acid. |

TABLE 3

| | Oil Name | Manufacturer | Properties |
|---|---|---|---|
| 6 | Yushiroken 350 | Yushiro Chemical Industry Co., Ltd. | Soluble in water and acetone. Clouded in hexane. Mineral oil formed of branched hydrocarbons having approximately 13 to 23 carbon atoms. Also contains cyclohexyl amine, oleic acid, and higher alcohol components such as dodecanol. |
| 7 | Alusol B | BP Japan Co., Ltd. | Soluble in water and acetone. Clouded in hexane. Contains mineral oil corresponding to fuel oil of light oil to B heavy oil fractions, containing linear and branched hydrocarbons as a main component. Also contains oleic acid diethanol amide. |
| 8 | UNISOLUBLE EM-B | JX Nippon Oil & Energy Corporation | Soluble in water and hexane. Clouded in acetone. Contains mineral oil corresponding to fuel oil of light oil to B heavy oil fractions, containing linear and branched hydrocarbons as a main component. |
| 9 | UNISOLUBLE EM-B | JX Nippon Oil & Energy Corporation | Soluble in water, clouded in hexane, and insoluble in acetone. Mineral oil containing branched hydrocarbons having a little higher molecular weight. Vontains hexylene glycol, limonene, 3-phenoxypropanol, and di-tert-butyl phenol. |

TABLE 4

| | Resistance Change Rate after Test | | |
|---|---|---|---|
| Oil | PTC Element A1 | PTC Element A2 | PTC element B |
| 1 | 0.74 | 0.77 | 1.98 |
| 2 | 0.89 | 0.88 | 1.39 |
| 3 | 0.78 | 0.79 | 20.73 |
| 4 | 0.77 | 0.80 | 1.51 |
| 5 | 0.77 | 0.81 | 98.06 |
| 6 | 0.77 | 0.81 | 43.64 |
| 7 | 0.77 | 0.80 | 43.12 |
| 8 | 0.77 | 0.81 | 22.75 |
| 9 | 0.77 | 0.80 | 28.23 |

INDUSTRIAL APPLICABILITY

Since the apparatus of the present invention uses the polymer PTC element having high environmental resistance, installation sites and applications thereof are not limited, and the apparatus can be utilized in a wide variety of fields.

REFERENCE SIGNS LIST

11: PTC composition
12: Copper foil
13: Copper plating
14: Nickel plating
15: Tin plating
16: Solder resist
17: Prepreg

The invention claimed is:

1. An apparatus comprising a protecting element for protecting the apparatus in an emergency, wherein the protecting element is a polymer positive temperature coefficient (PTC) member comprising:
a polymer PTC composition comprising polyvinylidene fluoride (PVDF) and one or more polymer components, the PVDF further comprising:
a mass of at least 55% of the polymer PTC composition;
an average molecular weight of between $5 \times 10^3$ and $1 \times 10^6$; and
a crystallinity of between 30% and 60%; and
an electrically conductive filler, wherein the electrically conductive filler is dispersed in the polymer composition;
wherein the PTC member has a resistance change rate of between 0.74 and 0.89 after being immersed in oil for 200 hours.

2. The apparatus of claim 1, wherein the one or more polymer components has a resistance to oils, fats, and solvents.

3. The apparatus of claim 1, wherein the one or more other polymer components comprises an ethylene-tetrafluoroethylene copolymer (ETFE).

4. The apparatus of claim 3, wherein the polymer PTC composition comprises 58 mass % of PVDF and 10 mass % of ETFE and the electrically conductive filler comprises 32 mass % Carbon Black.

5. The apparatus of claim 4, further comprising a copper foil disposed on either side of the polymer PTC composition.

6. The apparatus of claim 5, further comprising a copper plating disposed adjacent the copper foil.

7. The apparatus of claim 6 further comprising a nickel plating disposed adjacent to the copper plating at opposing ends of the polymer PTC composition.

8. The apparatus of claim 7, further comprising a tin plating disposed adjacent to the nickel plating such that the nickel plating is disposed between the tin plating and the copper plating.

9. The apparatus of claim 3, wherein the polymer PTC composition comprises 56 mass % of PVDF and 10 mass % of ETFE and the electrically conductive filler comprises 34 mass % Carbon Black.

10. The apparatus of claim 9, further comprising a copper foil and a prepreg, the polymer PTC composition being divided into a first portion and a second portion, with the first portion being substantially surrounded with the copper foil, the second portion being substantially surrounded with the copper foil, wherein the first portion, the prepreg, and the second portion forming a sandwich.

11. The apparatus of claim 10, further comprising copper plating disposed on either side of the sandwich.

12. The apparatus of claim 11, further comprising nickel plating and tin plating, wherein the nickel plating is disposed adjacent to the copper plating and the tin plating is disposed adjacent to the nickel plating such that the nickel plating is between the copper plating and the tin plating.

13. The apparatus of claim 1, wherein the one or more other polymer components is selected from a group consisting of polyethylene, acrylic polymers, methacrylic polymers, and fluoropolymers.

14. The apparatus of claim 1, wherein the electrically conductive filler is selected from a group consisting of carbon black, graphite, black lead, a carbonaceous material, a metal, a conductive metal oxide, a conductive ceramic, a conductive polymer, and a combination of one or more of carbon black, graphite, black lead, carbonaceous material, metal, conductive metal oxide, conductive ceramic, and conductive polymer.

15. The apparatus of claim 14, wherein the electrically conductive filler comprises a carbonaceous material selected from a group consisting of carbon fibers, carbon nanotubes, glassy carbon, carbon beads, carbon black, and graphite.

16. The apparatus of claim 14, wherein the electrically conductive filler comprises a metal selected from a group consisting of gold, silver, copper, nickel, aluminum, tungsten, alloy of gold, alloy of silver, alloy of copper, alloy of nickel, alloy of aluminum, and alloy of tungsten.

17. The apparatus of claim 14, wherein the electrically conductive filler comprises a conductive ceramic selected from a group consisting of carbide, titanium borate, titanium nitride, titanium silicide, zirconium silicide, niobium silicide, molybdenum silicide, tantalum silicide, and tungsten silicide.

18. The apparatus of claim 14, wherein the electrically conductive filler comprises a metal oxide selected from a group consisting of metal oxide including indium-tin oxide, lithium-manganese complex oxide, vanadium pentoxide, tin oxide, zinc oxide, and potassium titanate.

19. The apparatus of claim 14, wherein the electrically conductive material is in a powder state.

* * * * *